(12) United States Patent
Aitchison et al.

(10) Patent No.: US 9,569,023 B2
(45) Date of Patent: Feb. 14, 2017

(54) TOUCH SENSITIVE FILM, TOUCH SENSING DEVICE, AND ELECTRONIC DEVICE

(71) Applicant: CANATU OY, Helsinki (FI)

(72) Inventors: Bradley J. Aitchison, Helsinki (FI); David P. Brown, Helsinki (FI); Bjorn Friour Mikladal, Helsinki (FI)

(73) Assignee: CANATU OY, Helsinki (FI)

( * ) Notice: Subject to any disclaimer, the term of this patent is extended or adjusted under 35 U.S.C. 154(b) by 0 days.

(21) Appl. No.: 14/348,129

(22) PCT Filed: Oct. 1, 2012

(86) PCT No.: PCT/FI2012/050936
§ 371 (c)(1),
(2) Date: Mar. 28, 2014

(87) PCT Pub. No.: WO2013/045766
PCT Pub. Date: Apr. 4, 2013

(65) Prior Publication Data
US 2014/0225855 A1    Aug. 14, 2014

Related U.S. Application Data

(60) Provisional application No. 61/541,414, filed on Sep. 30, 2011.

(51) Int. Cl.
*G06F 3/041* (2006.01)
*G06F 3/01* (2006.01)

(52) U.S. Cl.
CPC ............... *G06F 3/041* (2013.01); *G06F 3/016* (2013.01); *G06F 2203/04103* (2013.01); *G06F 2203/04809* (2013.01)

(58) Field of Classification Search
CPC .......... G06F 3/041; G06F 3/0354; G06F 1/16; G06F 3/016; G06F 2203/04809; G06F 2203/04103; B82Y 40/00; B82Y 30/00; H03K 17/96
See application file for complete search history.

(56) References Cited

U.S. PATENT DOCUMENTS

| 4,197,439 A | 4/1980 | Mecklenburg et al. |
| 2003/0076301 A1 | 4/2003 | Tsuk et al. |

(Continued)

FOREIGN PATENT DOCUMENTS

| CN | 1845839 | 10/2006 |
| CN | 101893954 | 11/2010 |

(Continued)

OTHER PUBLICATIONS

International Search Report dated Apr. 17, 2013, corresponding to PCT/FI2012/050936.

(Continued)

*Primary Examiner* — Adam R Giesy
(74) *Attorney, Agent, or Firm* — Young & Thompson

(57) ABSTRACT

A touch sensitive film (1) includes a conductive layer (2) having a touch sensing region (3), and a user input surface (4). The user input surface of the touch sensitive film includes a tactilely distinguishable surface feature (5) deviating from the general nature of the user input surface (4) for identifying the location of the touch sensing region (3) by sensing the tactilely distinguishable surface feature.

20 Claims, 11 Drawing Sheets

(56) References Cited

U.S. PATENT DOCUMENTS

| | | | |
|---|---|---|---|
| 2005/0030292 A1* | 2/2005 | Diederiks | G09B 21/003 345/173 |
| 2005/0052426 A1 | 3/2005 | Hagermoser et al. | |
| 2009/0058687 A1 | 3/2009 | Rothkopf et al. | |
| 2009/0135150 A1* | 5/2009 | Takashima | G06F 3/041 345/173 |
| 2009/0250267 A1* | 10/2009 | Heubel et al. | 178/18.03 |
| 2010/0045610 A1* | 2/2010 | Hong et al. | 345/173 |
| 2010/0048250 A1 | 2/2010 | Jiang et al. | |
| 2010/0097327 A1* | 4/2010 | Wadsworth | G06F 3/04886 345/173 |
| 2010/0097346 A1* | 4/2010 | Sleeman | 345/174 |
| 2010/0162109 A1 | 6/2010 | Chatterjee et al. | |
| 2010/0242274 A1 | 9/2010 | Rosenfeld et al. | |
| 2010/0315348 A1* | 12/2010 | Jellicoe | G06F 3/041 345/173 |
| 2011/0109586 A1 | 5/2011 | Rip et al. | |
| 2011/0157037 A1* | 6/2011 | Shamir | G06F 1/1626 345/173 |
| 2011/0171419 A1* | 7/2011 | Li et al. | 428/113 |
| 2012/0111491 A1 | 5/2012 | Huang et al. | |
| 2012/0193211 A1* | 8/2012 | Ciesla et al. | 200/81 H |
| 2013/0079139 A1 | 3/2013 | Gray | |
| 2014/0292396 A1* | 10/2014 | Bruwer et al. | 327/517 |

FOREIGN PATENT DOCUMENTS

| | | | |
|---|---|---|---|
| DE | 202009000139 | 5/2010 | |
| FI | WO 2011107665 A1 * | 9/2011 | B82Y 30/00 |
| FR | 2825832 | 12/2002 | |
| GB | 2161122 | 1/1986 | |
| JP | 2005507112 | 3/2005 | |
| JP | 2009134451 | 6/2009 | |
| TW | 200844416 | 11/2008 | |
| WO | 2005/085130 | 9/2005 | |
| WO | 2007/101906 | 9/2007 | |
| WO | 2010/120070 A2 | 10/2010 | |
| WO | 2011/107666 | 9/2011 | |
| WO | 2011107665 | 9/2011 | |

OTHER PUBLICATIONS

Canatu Oy: Nanobud Revolutionises Car Control, Article on Tekes Website [online], Jun. 22, 2011 [retrieved on Apr. 12, 2013]. Retreived from the Internet URL:http://www.tekes.fi/encommunity/Success_stories/416/Success_story/667?name=Nanobud+revolutionises+car+control the whole document.

Taiwanese Office Action dated May 24, 2016; Application No. 10520632250.

Japan Notice of Reasons for Rejection dated Jul. 12, 2016; Application No. 2014-532443.

Chinese Office Action dated Dec. 12, 2016.

\* cited by examiner

TOUCH SENSITIVE FILM, TOUCH SENSING DEVICE, AND ELECTRONIC DEVICE

FIELD OF THE INVENTION

The present invention relates to touch sensitive films, and to touch sensing devices and electronic devices utilizing touch sensitive films.

BACKGROUND OF THE INVENTION

User interfaces for different kinds of electrical apparatuses are nowadays more and more often realized by means of different types of touch sensing devices based on touch sensitive films instead of conventional mechanical buttons. Here, mechanical buttons refers to related mechanical actuators such as on/off buttons, toggles, dials, rollers, sliders and switches. Different kinds of touch pads and touch screens of e.g. mobile phones, portable computers and similar devices are well known examples of these. In addition to the sophisticated and even luxurious user experience achievable, touch sensing devices based on touch sensitive films also provide a superior freedom to the designers continuously trying to find functionally more versatile, smaller, cheaper, lighter, and also visually more attractive devices.

A key element in such touch sensing devices is a touch sensitive film (TSF) comprising one or more conductive layers configured to serve as one or more sensing electrodes. The general operating principle of this kind of film is that the touch of a user by e.g. a fingertip or some particular pointer device changes the electrical properties of an electrical measuring circuitry to which the TSF is connected. The actual measuring principle can be e.g. resistive or capacitive, the latter one being nowadays usually considered the most advanced alternative providing the best performance in the most demanding applications.

One promising new approach for TSFs is found in layers formed of or comprising networked nanostructures. In addition to a suitable conductivity performance, a layer consisting of networks of e.g. carbon nanotubes (CNT), or carbon NANOBUD®s having fullerene or fullerene-like molecules covalently bonded to the side of a tubular carbon molecule (NANOBUD® is a registered trade mark of Canatu Oy), are clearly less visible to a human eye than e.g. transparent conductive oxides like ITO (Indium Tin Oxide). Besides, as is well known, nanostructure-based layers can possess flexibility, stretchability, thermoformability, mechanical strength and stability superior in comparison with e.g. ITO. These properties of nanostructure-based layers provide entirely new possibilities for designing touch-based user interfaces. For example, the flexibility or thermoformability of a TSF enables implementation of TSFs on three-dimensional surfaces. For example, in a mobile electronic device, the TSF can extend not only over the typically planar front surface but also to the sides of such a device. Such TSF can have several touch sensing regions. Then, the TSF can also be used, for example, to replace the mechanical buttons (i.e. related mechanical actuators such as on/off buttons, toggles, dials, rollers, sliders and switches) conventionally located on the sides of the device.

However there is still a strong demand in the market for further enhanced TSFs and touch sensing devices. Particularly, the transfer from conventional mechanical elements to user interfaces relying entirely on TSFs requires new solutions for improving the user experience.

PURPOSE OF THE INVENTION

The purpose of the present invention is to provide novel solutions for the above-defined demand.

SUMMARY OF THE INVENTION

The present invention is characterized by what is presented in claims 1, 15 and 16.

The first aspect of the present invention is focused on a touch sensitive film (hereinafter referred also as "TSF") comprising a conductive layer having a touch sensing region (hereinafter referred also as "TSR"), and a user input surface (hereinafter referred also as "UIS").

A touch sensitive film means, in general, a film which can be used as a touch sensitive element in a touch sensing device. A touch sensing device is to be understood here broadly to cover all user interface devices operated by touching the device e.g. by a fingertip or a stylus, as well as other types of devices for detecting the presence, location, and/or movement of one or more such fingers, pointers or other objects.

In the context of the present invention, the word "touch" is to be interpreted broadly, covering, in addition to true physical contact between a finger, stylus or other pointer and the touch sensitive film, also situations where such pointer is brought to sufficiently close proximity to the TSF to be detected by it.

In operation, when a TSF is connected as a part of a suitably configured electrical measurement circuitry of a touch sensing device, a touch of one or more objects on the film, or the presence of one or more objects in the proximity of the film, causes a change in one or more electrical properties in the circuitry, based on which the touch can be detected and, depending on the application, preferably also its location on, proximity to, and/or movement across the touch sensing region determined. In practice, this change is detected by supplying an excitation signal to, and receiving a response signal from, the TSF, and monitoring the changes of the latter.

In general, the TSF of the present invention can form all or part of any type of touch sensor or touch sensing device incorporating a TSF, not being limited to the examples described below.

The TSF can be a capacitive TSF. A capacitive TSF means here a touch sensitive element by using which the detection of a touch can be primarily based on a capacitive sensing principle. A capacitive sensing principle or capacitive operation of a TSF means that, when the TSF is connected to a proper sensing circuitry, one or more touches can be detected based on the changes said touches cause in the capacitive coupling between the TSF and the ambient, or between different points of the TSF.

On the other hand, the TSF of the present invention can also operate inductively. By inductive operation is meant here, that an object induces an inductive coupling between the TSF and the ambient, or between different points of the TSF. In other words, capacitive or inductive coupling can also be seen as coupling to the TSF an external capacitance or inductance, respectively.

Also, the TSF of the present invention can operate resistively. By resistive operation is meant here, that an object causes a detectable change in the resistivity/current or voltage across an electrical pathway or a collection of pathways in a device containing one or more resistive films and this detectable change can then be converted into a location. Other touch sensors incorporating touch sensing films are known in the art.

Further, the TSF of the present invention is not limited to any particular detection principle but, instead, can be based on any detecting principle being based on the utilization of the conductive layer. Thus, the TSF can also be configured to detect touch-induced changes in e.g. resistance, voltage, phase angle, capacitance, induction or current. The detection can be based on, for example, the absolute or relative position or velocity of or pressure induced by a touching object.

A conductive layer is a layer formed of one or more electrically conductive materials. By "conductive" is meant here any material capable of allowing flow of electric charge in the material, irrespective of the conductivity mechanism or conductivity type of the material. Thus, "conductive" covers here, for instance, also semiconductive or semiconducting materials. In the operation of the TSF as a part of a touch sensing device, the excitation signals are supplied to and the response signals are measured from one or more conductive layers.

Preferably, the sheet resistance of the conductive layer in the touch sensing region is higher than or equal to 3 k$\Omega$, even more preferably in the range of 5 to 100 k$\Omega$, most preferably within the range of 10 to 50 k$\Omega$. As disclosed in the applicant's earlier application WO 2011/107666, those resistance values provide excellent sensitivity and touch location resolution performance of the TSF, and also enables detecting touches on and in the proximity of the TSF inductively. Further, said resistivity range is advantageous in that it allows, particularly in the case of a conductive layer comprising HARMS network(s), making the transparency of the touch sensitive film very high.

Possible groups of materials for the conductive layer are formed, for example, by different conductive polymers and metal oxides. On the other hand, in one preferred embodiment, the conductive layer comprises a High Aspect Ratio Molecular Structure (HARMS) network. By HARMS or HARM structures is meant here electrically conductive structures with characteristic dimensions in nanometer scale, i.e. dimensions less than or equal to about 100 nanometers. Examples of these structures include carbon nanotubes (CNTs), carbon NANOBUD®s (CNBs), metal (e.g. silver, gold or copper) nanowires, and carbon nanoribbons. In a HARMS network, a great number of these kinds of single structures, e.g. CNTs, are interconnected with each other. In other words, at a nanometer scale, the HARM-structures do not form a truly continuous material, such as e.g. the conductive polymers or ITO, but rather a network of electrically interconnected molecules or structures. However, as considered at a macroscopic scale, a HARMS network forms a solid, monolithic material. As an essential feature, HARMS networks can be produced in the form of a thin layer.

The advantages achievable by means of the HARMS network(s) in the conductive layer include excellent mechanical durability, stretchability and thermoformability and high optical transmittance useful in applications requiring optically transparent TSFs, but also very flexibly adjustable electrical properties. To maximize these advantages, the conductive layer can be substantially entirely formed of one or more HARMS networks. Suitable processes to produce conductive layers comprising carbon nanostructure networks are described e.g. in WO 2005/085130 A2 and WO 2007/101906 A1 by Canatu Oy.

The touch sensing region (TSR), i.e. the touch sensitive region within a conductive layer is the "active" or operating portion of the conductive layer, i. e. the region within which the actual touch sensing operation is to be performed. The TSR can also cover the entire area of the conductive layer. There can be one or more conductive layers in a TSF, and one conductive layer can have one or more TSRs. There may be also areas of the conductive layer which can sense touch, but are not used for sensing touch and thus are not considered TSRs in the meaning explained above.

In addition to the conductive layer, the TSF can comprise also other layers and structures needed to implement an entire working touch sensitive element. For example, there can be a substrate layer and/or one or more layers for mechanical protection of the film. Moreover, there can be also one or more layers for refractive index or color matching, and/or one or more coatings, for instance, for anti-scratch, layer spacing, decorative, self-cleaning, or other purposes. According to the invention, these layers can be in any order or location with respect to the conductive layer. One or more of those additional layers can cover the area of the touch sensitive film only partially, e.g. at the location(s) of the touch sensing region(s) only.

In an electronic device utilizing a touch sensitive film according to the present invention, the outermost layer(s) of the touch sensitive film can actually be formed by the casing or other parts of the electronic device itself. On the other hand, the outermost layer(s) of the touch sensitive film integrated as a part of such electronic device can form a part of the electronic device casing. Thus, the touch sensitive film is to be understood to include all elements taking part.

Besides the layered elements, the TSF can also comprise three-dimensionally organized structures, e.g. contact electrodes and other contact structures or vias extending through the TSF or a portion thereof. Though, for simplicity, these additional films and structures are not shown in all figures of the detailed description below, they are included within the scope of the invention.

By user input surface (UIS), i.e. the user interface surface, is meant the surface of the TSF, on which, when in use, the TSF is configured to sense touches. In other words, the UIS forms the actual touch-based user interface of the TSF. Typically, the UIS is the free surface of the TSF being arranged on or integrated in an electronic device to be operated by means of the TSF.

According to the present invention, the user input surface of the touch sensitive film comprises a tactilely distinguishable surface feature (hereinafter referred also as "TDSF") deviating from the general nature of the user input surface for identifying the location of the touch sensing region by sensing the tactilely distinguishable surface feature. In other words, in a touch sensitive film TSF according to the present invention, the touch sensing region is "marked" by means of a TDSF so that the user of the touch sensitive film or a device utilizing it can identify, i.e. recognize, the location of the touch sensing region on the basis of the tactile feeling produced by the TDSF. Thereby the user ensures he/she is touching the right position or area on the user input surface, i.e. the touch sensing region.

Said "marking", allowing the identifying of the location of the sensing region by sensing the TDSF necessitates, naturally, that the location of the TDSF must be so linked to the location of the TSR that the user of the TSF is able to determine, based on said sensing, whether the user is touching the TSF within the TSR. First, the TDSF can be located on the area of the TSR, covering it partly or entirely. Alternatively, one or more TDSFs can lie adjacent to the area of the TSR. For example, a TDSF or a plurality of TDSFs can surround the area of the TSR.

Said basic principle of the present invention provides great advantages for designing TSF-based user interfaces. Touch sensitive films according to the present invention can be used to implement not only touch screens where the TSF is superposed on a display, wherein the user locates the touch on the UIS on the basis of the information presented on the display, but also other touch-based user input arrangements. For example, a TSF according to the present invention can be used to replace various conventional mechanical buttons and actuators, as is explained in more detail later in this description.

The TDSF can be implemented in various ways to allow identifying the location of the TSR on the basis of the tactile feeling differing from the general tactile feeling produced by the UIS. First, the TDSF can comprise one or more protuberances deviating from the general level of the UIS for identifying the location of the TSR by sensing the protuberance(s). On the other hand, the TDSF can comprise texture deviating from the general texture of the UIS for identifying the location of the TSR by sensing the texture of the TDSF. Depending on the general nature of the UIS, this can mean a textured surface, non-textured surface, or any texture differing from the general texture surrounding the TDSF to provide a distinguishable tactile feel.

A UIS can comprise such TDSFs in any combination. For example, a UIS can comprise several protuberances, possibly together forming a TDSF or a part thereof, or a single protuberance with a larger area can itself have a textured surface deviating from the general texture of the UIS to form a TDSF. Naturally, in addition to protuberances and textures, also other solutions are possible for implementing a TDSF.

The protuberance can be have any form deviating from the general level of the UIS so that it can be sensed by the user touching the TSF by a finger and/or by means of, for instance, a mechanical stylus. Sufficient deviation for allowing this sensing depends, for example, on the height of the protuberance with respect to the general level of the UIS, and on how abrupt said deviance is, i.e. how sharply the surface of the UIS changes in the area of the protuberance.

As a very simple example, the protuberance can be just a point-like protrusion extending either outwards or inwards from said general level of the UIS. It can also comprise, for example, an inwards or outwards protruding contour line, ridge or valley surrounding the sensing region. Thus, for the avoidance of confusion, "protuberances" here also include indentations, cavities, or holes.

Simple examples of regions of different texture than the general texture of the UIS to achieve a TDSF can include variation in sponginess, roughness, smoothness, lubricity and/or stickiness. This can be achieved by various surface treatments or material choices, which as such are known in the art.

In general, the tactilely distinguishable surface features, i.e. surface modifications which are tactilely distinguishable from the other areas of the user input surface, can be implemented by using any suitable means. Thus, they are not limited to the examples above. On the other hand, the actual details of the TDSF design can vary according to the principles known in the art of tactile sensing, so no details of e.g. suitable heights of protuberances or surface structures and materials of textures are needed to be explained here.

The tactilely distinguishable surface feature, e.g. one or more protuberances or texture, may be configured to create a graded tactile feeling for a user touching the UIS. By graded tactile feeling is meant here that the tactile feeling is not uniform throughout the area of the TDSF but varies depending on the location of the touch on the TDSF. This grading can, for instance, give an indication of scale or location.

For example, in a TDSF and a TSR configured to serve as scroll bar, one end of the scroll bar can be rougher, stickier, and/or have differently shaped and/or spaced protuberances than the other end of the scroll bar. Thus, the difference in the protuberances, textures or combinations thereof can be used to indicate the position of the touch on TDSF/TSR.

A protuberance on the UIS can be implemented in various ways. First, it is possible to have the protuberance in the upper surface of the outermost layer of the TSF, said outermost layer being different from the conductive layer. For example, the outermost layer can be a layer also serving as a protective anti-scratch layer or for decorative purposes. The lower surface of such outermost layer can be flat or the protuberance can be implemented by conformally forming said outermost layer on a lower layer having a corresponding protuberance. On the other hand, it is also possible to have the protuberance in the conductive layer itself. First, the protuberance can be formed on the upper layer of the conductive upper surface, i.e. on the surface on the side of the UIS. Alternatively, the conductive layer can be formed to conformally follow a three-dimensional shape of a surface beneath it.

There are numerous methods known in the art to produce conformal films according to the present invention. Those methods include Film Blowing, Extrusion Blow Moulding, Profile Extrusion Moulding, Injection Blow Moulding, Injection Moulding, Gas Assisted Injection Moulding, Injection Stretch Blow Moulding, Insert Moulding, Moulding Expanding, Rotational Moulding, Structural Foam Moulding, Thermoforming/Vacuum Forming, Pultrusion, Transfer Moulding, SMC/DMC Moulding, In Mould Labeling and In Mold Decoration. Conductive layers can also be directly conformally deposited on already formed surfaces by numerous gas and liquid phase processes such as spin coating, wet and dry printing such as offset, screen, flexographic or laser printing, spray coating, inkjet printing, CVD, and Direct Dry Printing of an aerosol via e.g. thermophoresis, impaction, electrophoresis and transfer printing. Other processes to produce films having protuberances thereon include, but are not limited to, e.g. stamping and hot embossing.

In the case of the preferred conductive layer comprising a network of HARM-structures, one suitable method to fabricate a conductive layer conformally covering a three-dimensional surface is described in WO 2011/107665 by Canatu Oy.

The TSR and the TDSF can lie on a planar section of the TSF, wherein the general level of the UIS referred to above means the level of the planar surface. Alternatively, the TSF can comprise a curved section, wherein at least one of the TSR and TDSF can lie on said curved section of the TSF. In such case, the general level of the UIS referred to above means the tangential level of the continuously curved surface. A TSF comprising a curved section enhances further the versatility of the present invention.

There are many possibilities to implement a TSF comprising a curved section. One preferred choice is again a TSF based on conductive layer comprising one or more networks of HARMS, which enable to select the form of the conductive layer very freely.

As stated above, a TSF according to the present invention can be used e.g. to replace conventional mechanical buttons (such as on/off buttons and related mechanical actuators such as toggles, dials, sliders and switches) in various electronic devices. In other words, instead of one or more mechanical buttons, there can be a TSF with one or more sensing regions "marked" by, i.e. being identifiable by means of one or more TDSFs on the UIS forming a part of surface, or the entire surface, of such device. Thus, instead of a button to be pushed or otherwise mechanically displaced, the user can then give an input by just touching the TDSF of the TSF. The protuberance or other TDSF on the user input surface allows the user to ensure the correct location of the touch within the TSR. Note that mechanical buttons refer here to all related mechanical actuators such as on/off buttons, toggles, dials, sliders and switches.

To implement the above possibilities of the present invention, one alternative is that the touch sensing region is configured to act as a slider, i.e. a typically elongated user interface arrangement, wherein the user controls the input by the actual location of the touch, or by movement of the touch along said interface arrangement. In a preferred embodiment of a TSR configured to act as a slider is substantially U-shaped. This simplifies the implementation of the slider-like TSR, as explained more in the detailed description.

In another alternative, the touch sensing region has substantially annular shape and is configured to act as a dial, wherein the input is controlled, like in the slider, by the actual location of the touch, or by movement of the touch along said annular TSR.

Preferably, the touch sensitive film according to the present invention comprises a plurality of touch sensing regions. This way, one single TSF can be used to implement several functions, which greatly simplifies the structure and assembly of a device utilizing the TSF. For example, one touch sensing region can be configured to cover the area of a display of an electronic device to form together with the display a touch screen. The other touch sensing region(s) can be configured to serve as touch based user input element(s) of the electronic device, thus replacing various mechanical buttons and actuators of conventional devices. For example, one touch sensing region can be configured to act as a power switch of the electronic device.

Preferably, the TSF is formed as a flexible structure so as to allow bending thereof along a three dimensional surface. A "flexible" structure means here a structure allowing bending, preferably repeatedly, in at least one direction with a radius of curvature below 10 mm, more preferably below 5 mm. Preferably, the TSF is flexible in at least two directions simultaneously.

Instead of or in addition to the flexibility, the TSF can also be formed as a deformable structure so as to allow deforming thereof, e.g. by using thermoforming (e.g. by vacuum or otherwise), conformally along a three dimensional surface.

Flexibility and/or deformability of the TSF, together with the TDSF(s) for identifying the TSR opens entirely novel possibilities to implement touch sensing devices. For example, a TSF serving as the user interface of a mobile device can be bent or formed to extend to the device edges so that the TSF can cover even the entire surface of the device. In a TSF covering different surfaces of a three dimensional device surface and comprising a plurality of touch sensing regions, those several touch sensing regions may be configured for different purposes. In one advantageous embodiment, one sensing region covers the area of a display to form a touch screen. Other sensing regions e.g. at the sides of the device can be configured according to the core principle of the present invention to serve as touch sensitive elements replacing, as described above, the conventional mechanical actuators, e.g. the power switch or the screen brightness slider.

Moreover, the deformability can also allow formation of the protuberance of the UIS by deforming the TSF on a surface having a corresponding protruded section.

Also from the point of view of flexible and/or deformable TSFs, a preferred choice for the conductive layer is a conductive layer comprising one or more HARMS networks. HARM structures and the networks thereof are inherently flexible, thus enabling making the TSF bendable and/or deformable.

The second aspect of the present invention is focused on a touch sensing device comprising a touch sensitive film according to the first aspect of the present invention, the principles of and the advantages of which are discussed above. The device further comprises circuitry means for supplying an electrical excitation signal to and receiving an electrical response signal from the TSF, and processing means for processing the electrical response signal received from the TSF for detecting a touch on the basis of the effects of the touch on the response signal. Thus, by "touch sensing device" is meant here an entire operable device comprising, in addition to the TSF, also other elements like measurement electronics and measurement algorithm software therein necessitated to carry out the touch sensing operations.

The circuitry means can comprise different types of contact electrodes, wirings and other form of conductors, switches, and other elements needed to connect the TSF and the one or more conductive layers thereof to the rest of the touch sensing device. Correspondingly, the processing means can comprise any hardware and electronics as well as software tools for generating and controlling signals needed in operating the TSF. They can also comprise any means to measure, collect, and process response signals in order to detect and locate touches on the TSF. The circuitry means and the control means can be implemented by means of known components, elements and principles.

An excitation signal means here any electrical signal for being coupled to the conductive layer of the TSF via the circuitry means and providing conditions suitable for monitoring the changes a touch induces in these conditions. The excitation signal could also be called, for example, a drive signal or a stimulation signal. Typical examples are AC current and voltage. A response signal is correspondingly any electrical signal measured from a conductive layer by using the circuitry means and allowing detection of a touch on the basis of changes the touch causes to this signal.

The touch sensing device of the present invention can be implemented as a standard or customized stand-alone module or as an non-separable unit integrated as a part of some larger device, e.g. a mobile phone, portable computer, e-reader, electronic navigator, gaming console, car dashboard or steering wheel, etc.

The third aspect of the present invention is focused on an electronic device characterized by that the electronic device comprises a touch sensitive film according to the first aspect of the present invention, the principles of and the advantages of which are discussed above, wherein the touch sensitive film is configured to serve as a user interface of the electronic device. The electronic device can be e.g. a mobile electronic device such as a mobile phone or a smartphone.

In a preferred embodiment, the touch sensitive film comprises a plurality of touch sensing regions, the plurality of touch sensing regions comprising a touch sensing region covering at least partly the area of a display of the electronic device to form a touch screen. This kind of single multifunction touch sensitive film can greatly simplify the assembly of the electronic device in comparison with separate touch screen and mechanical actuators. This provides cost savings which are particularly useful for mobile electronic devices.

BRIEF DESCRIPTION OF THE DRAWINGS

The present invention is discussed in more detail in the following with reference to the accompanying figures illustrating examples of preferred embodiments of the present invention.

In the Figures, the corresponding elements are referred in the drawings by the same reference numbers.

DETAILED DESCRIPTION OF THE INVENTION

Figure 1:
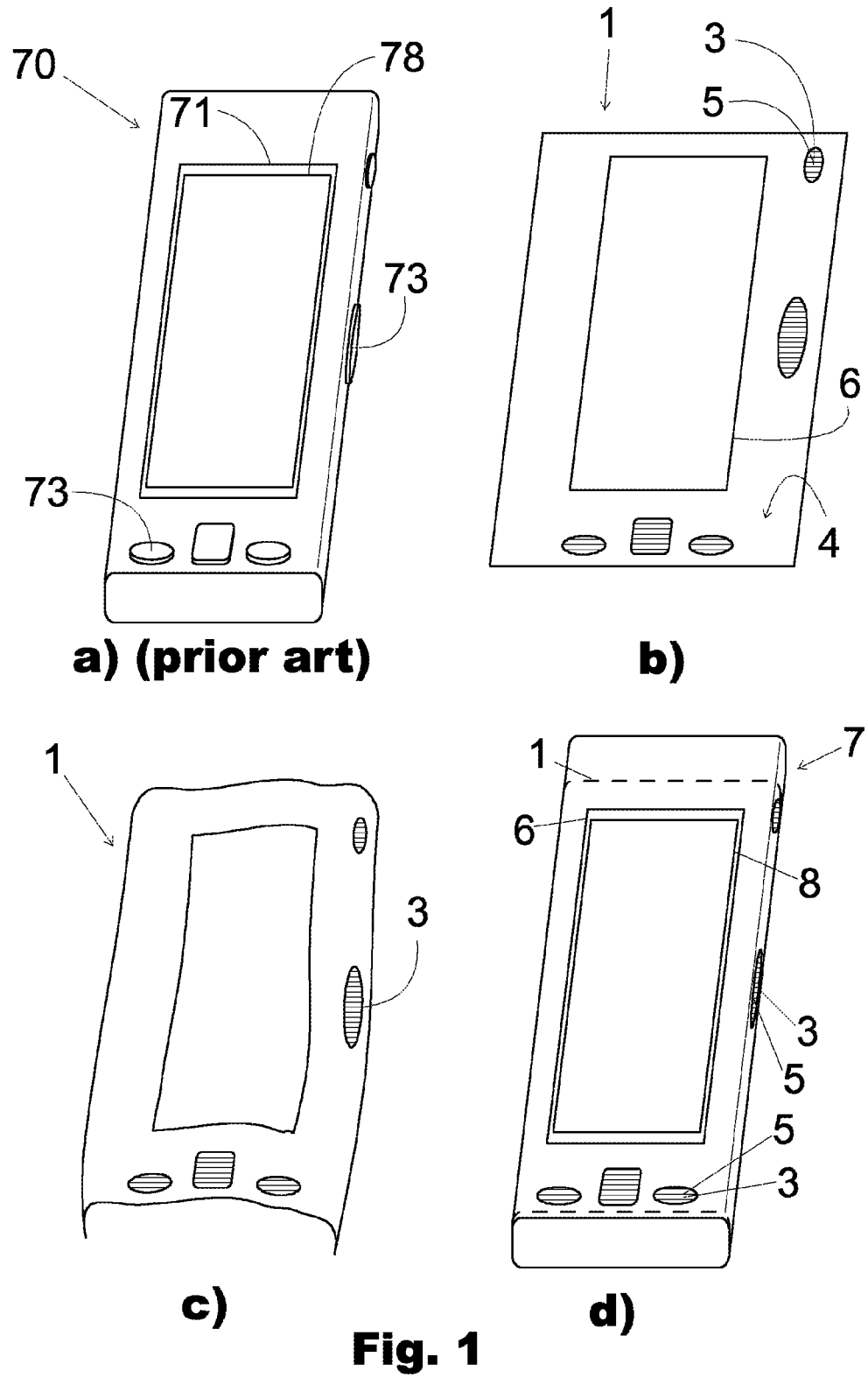
FIG. 1a represents prior art.
FIGS. 1b-1d show schematic illustration of a touch sensitive film and an electronic device according to one embodiment of the present invention.

FIG. 1a shows a schematic illustration of a mobile electronic device according to the prior art. The mobile electronic device 70, e.g. a mobile phone, comprises a display 78 to show different information to the user of the mobile electronic device. Superposed on the display is a touch sensitive film 71. The display and the touch sensitive film together form a touch screen serving as a part of the user interface of the mobile electronic device. Further, there are various mechanical actuators 73 at different locations of the mobile electronic device casing to serve as further user input elements for different purposes. These actuators can comprise e.g. push buttons, sliders, etc. In prior art devices, such mechanical actuators are used, for example, as power switches, loudspeaker controllers, switches to turn the device on a standby mode, etc.

FIG. 1b shows a touch sensitive film 1 according to the present invention. In the core of the touch sensitive film is a conductive layer (not visible as a separate layer in the drawings of FIGS. 1b to 1d). The surface of the touch sensitive film visible in the drawing forms the user input surface 4 for receiving the touches of the user of the touch sensitive film. There are five relatively small touch sensing regions 3 in the conductive layer, located near the periphery of the touch sensitive film. On the upper surface of the touch sensitive film, i.e. the user input surface 4, there are areas of tactilely distinguishable surface features 5, i.e. surface features providing a tactile feel which differs from the tactile feel provided by the surrounding areas of the user input surface.

The tactilely distinguishable surface features 5 may comprise e.g. one or more protrusions, indentations, grooves, ridges, valleys, etc., deviating from the general level of the user input surface and thus being tactilely detectable. Further, instead of or in addition to those features, the tactilely distinguishable surface features can comprise one or more types of textures differing from the general texture of the user input surface so as to make those features tactilely distinguishable.

The purpose of the areas having the tactilely distinguishable surface features 5 is to provide means for tactilely identify the location of the touch sensing regions 3 so that the user can ensure the right location of the touch. In the example of FIGS. 1b-1d, the areas having the tactilely distinguishable surface features 5 are co-located with the areas of the touch sensing regions 3. Alternatively, one or more tactilely distinguishable surface features 5 may be located within the touch sensing region 3 without entirely covering it, surrounding the touch sensing region, or in any location so linked to the location of the touch sensing region that the purpose of identifying the touch sensing region can be met.

The touch sensing regions 3 may be configured to simply detect the presence of touches without defining the accurate location of the touch within the touch sensing area. However, it is also possible to have one or more of those touch sensing regions configured to detect also the location of touch or even multiple touches, and the movement of the touch(es) along the touch sensing region. This kind of touch sensing region can be configured to act e.g. as a slider or a dial.

In addition to the touch sensing regions 3 described above, the touch sensitive film 1 of FIGS. 1b-1d also comprises a further touch sensing region 6 covering the middle area of the touch sensitive film 1. This touch sensing regions is larger than the other touch sensing regions 3 and is not, though it could be, marked by any tactilely distinguishable surface feature. This touch sensing region 6 is configured to form, together with a display, a touch screen. In a touch screen, the user selects the location of touches on the basis of the information shown on the display, so marking the touch sensing region of a touch screen by tactilely distinguishable surface features is not necessary. Naturally, the operation as a part of a touch screen necessitates that the touch sensitive film is transparent at least in the area of this particular touch sensing region 6.

As illustrated in FIG. 1c, the touch sensitive film 1 can be bent or deformed so as to cover three dimensional surfaces. In other words, the touch sensitive film is flexible and/or deformable e.g. via thermoforming. Thanks to the capability to have a three dimensional shape, the touch sensitive film 1 also enables having touch sensing regions 3 on a curved section of the film, as can be seen in FIG. 1c.

In the mobile electronic device of FIG. 1d, the advantageous property of flexibility/deformability is utilized in a mobile electronic device 7, as a part of which a touch sensitive film 1 according to FIGS. 1a to 1c has been integrated. The touch sensitive film covers the most of the front surface of the mobile electronic device 7, and continues also to the edges and side surfaces thereof. The largest touch sensing region 6 forms, together with the display 8 of the device, a touch screen. The other touch sensing regions 3 on the mobile electronic device casing, marked with the areas of tactilely distinguishable surface features 5, serve as user interface elements replacing the mechanical actuators shown in the prior art device of FIG. 1a. Three of these touch sensing regions lie on the front surface of the mobile electronic device, and two of them lie on the side surface of the mobile electronic device.

Figure 2:
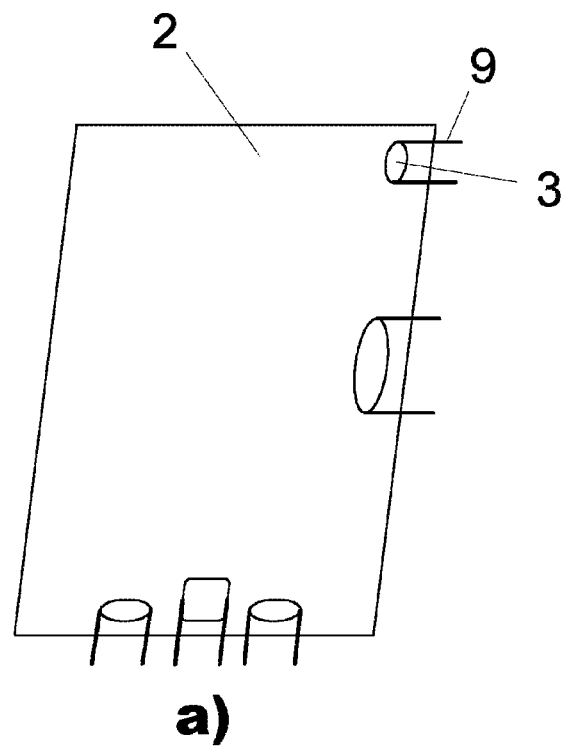
FIGS. 2a and 2b show schematic illustrations of parts of a touch sensitive film according to the present invention.
Figure 2:
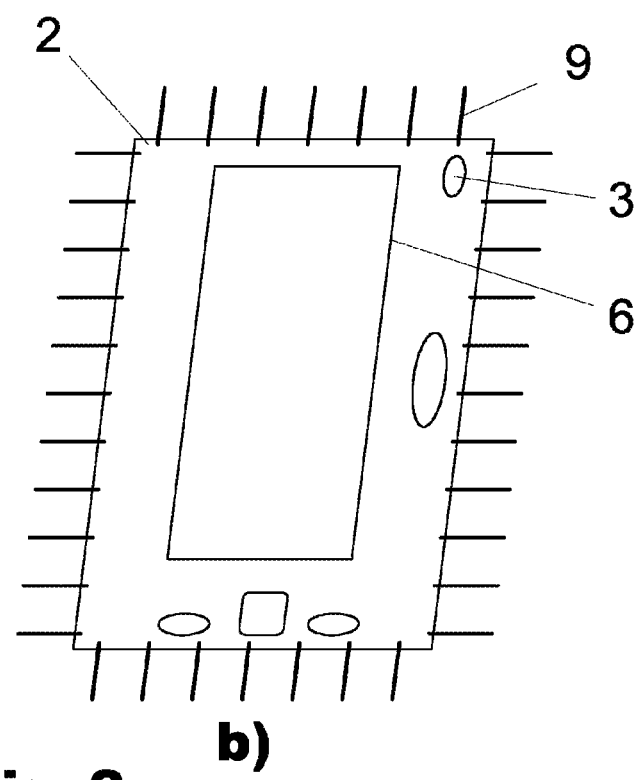
Figure 3:
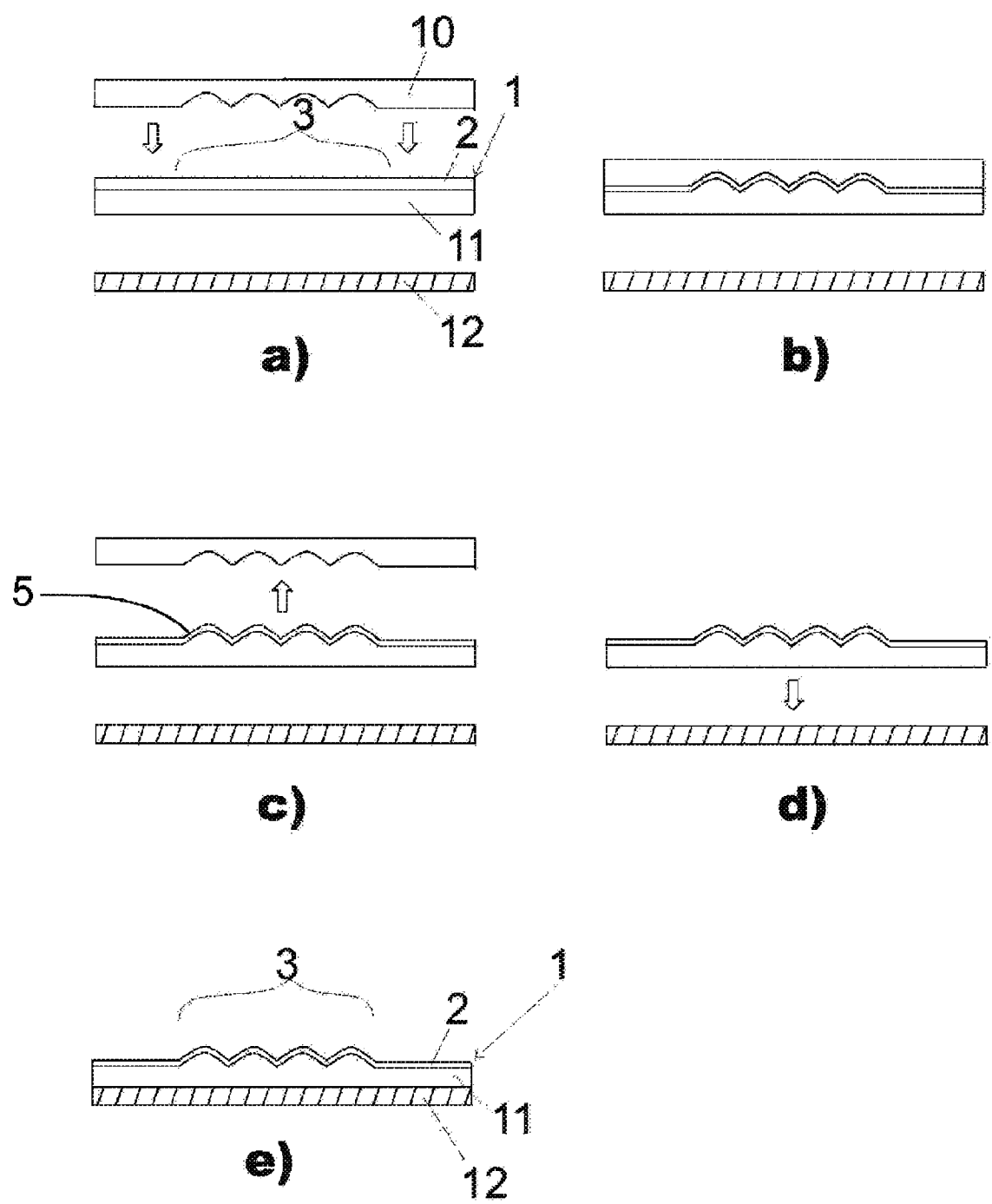
FIGS. 3a-3e, 4a-4e, 5a-5b, 6a-6b, 7a-7c, 8a-8c, and 9a-9d are schematic illustrations of different methods to produce touch sensitive films according to the present invention.
Figure 4:
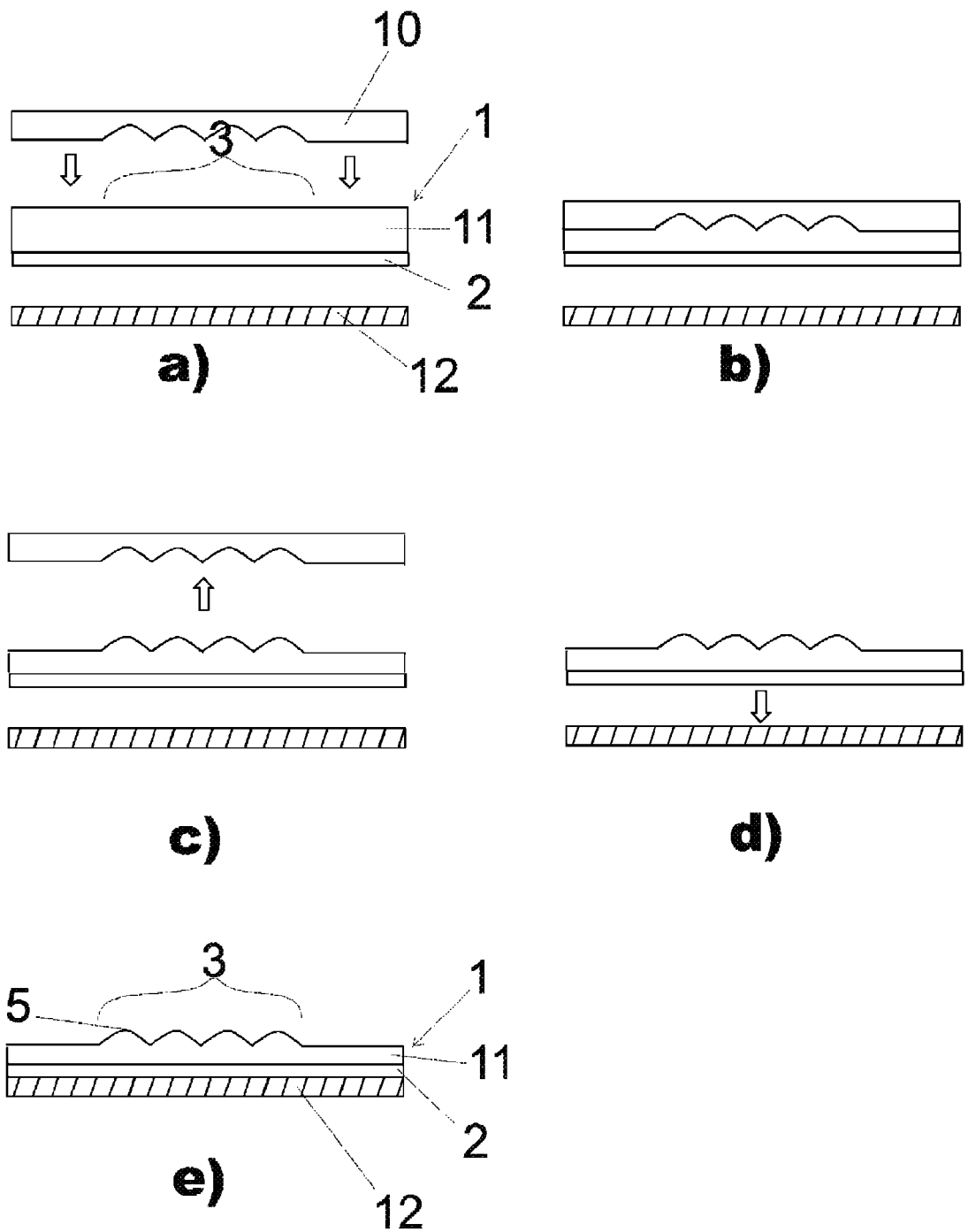

FIGS. 2a and 2b illustrate schematically conductive layers 3 and the associated structures of touch sensitive films according to the present invention. The conductive layer 2 of FIG. 2a represents an approach where each of the touch sensing regions 3 are contacted via own electrodes 9. In other words, the conductive layer 2 of the TSF is segmented so that the conductive layer has only been deposited or otherwise formed in the areas of the TSRs 3, and electrodes 9 are connected to each TSR as needed by the touch sensing device design.

FIG. 2b illustrates a conductive layer 2 which is non-segmented, i.e. the conductive layer is continuous also outside the touch sensing regions 3, 6. In this configuration, electrodes 9 are only attached to the periphery of the TSF as needed by the touch sensor design, and the touch sensing regions 3 are defined by the software, algorithm, and electronics of the entire touch sensing device, a part of which the conductive layer 2 and the other parts of the touch sensitive film form. Thus, the regions outside the TSRs may be able to sense touch, but the touch sensitive film is configured to respond to touches in the defined TSRs only. The detailed configuration and operation principle of such touch sensitive film and touch sensing device can be similar to those described in WO 2011/107666 by Canatu Oy. The sheet resistivity of the conductive layer 2 is then preferably higher than or equal to 3 k$\Omega$, even more preferably in the range of 5 to 100 k$\Omega$, most preferably within the range of 10 to 50 k$\Omega$.

FIGS. 3a to 3e illustrate schematically utilization of embossing to form protrusions 5 in the area of a touch sensing region 3 of a conductive layer 2 of a touch sensitive film 1. A stamping tool 10 is used to produce a series of protrusions 5 in the substrate layer 11 of the touch sensitive film and the conductive layer 2 thereon. After producing the protrusions 5 forming surface features which are tactilely distinguishable from the other parts of the TSF outside the touch sensing region 3, the stamped TSF can be attached to an object surface 12, e.g. a surface in a mobile electronic device casing, to serve as the user interface of that device. In this example, the protrusions 5 are formed in the substrate layer 11, whereas the substantially thinner conductive layer 2 remains substantially uniform in its thickness. As an alternative to a mobile electronic device, the object surface can also be a surface of e.g. a steering wheel or center console of an automobile, a user interface of a refrigerator or a stove, or any other device or object for which a touch based user interface is desirable.

FIGS. 4a-4d illustrate schematically utilization of embossing to form protrusions 5 in the free surface of the substrate layer 11 only, the surface thereof adjacent to the conductive layer 2 remaining flat.

Figure 5:
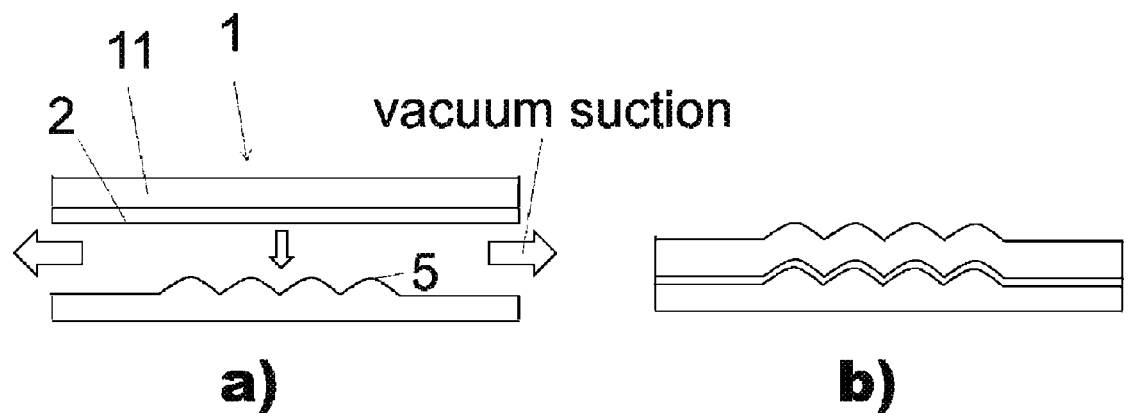

FIGS. 5a and 5b illustrate schematically utilization of vacuum thermoforming to form the tactilely distinguishable protrusions 5 on the user input surface 4 of the TSF 1. Heat and vacuum is used to conformally deform and attach the TSF 1 to an object surface 12 with a series of protrusions 5.

Figure 6:
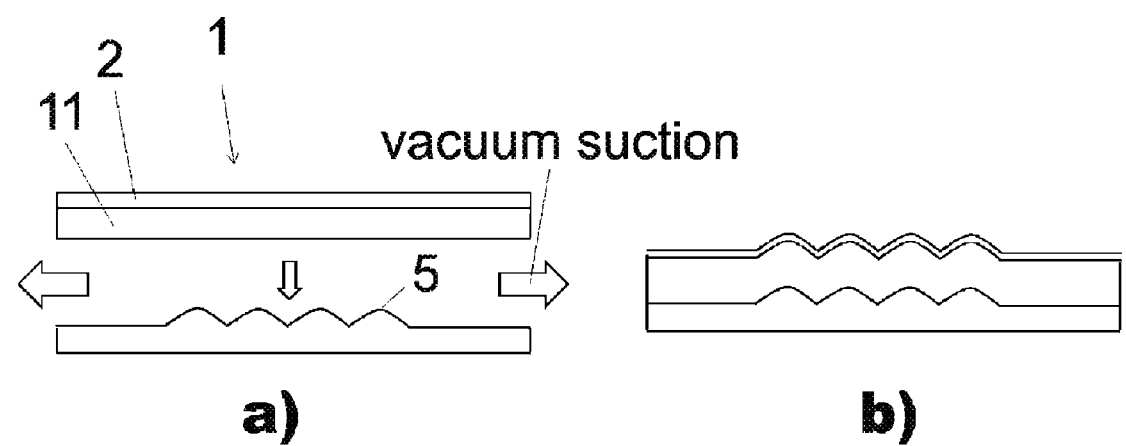

FIGS. 6a and 6b illustrate schematically a variation of the process of FIGS. 5a and 5b, wherein the layer adjacent to the object surface 12 is the substrate layer 11 instead of the conductive layer 2.

Figure 7:
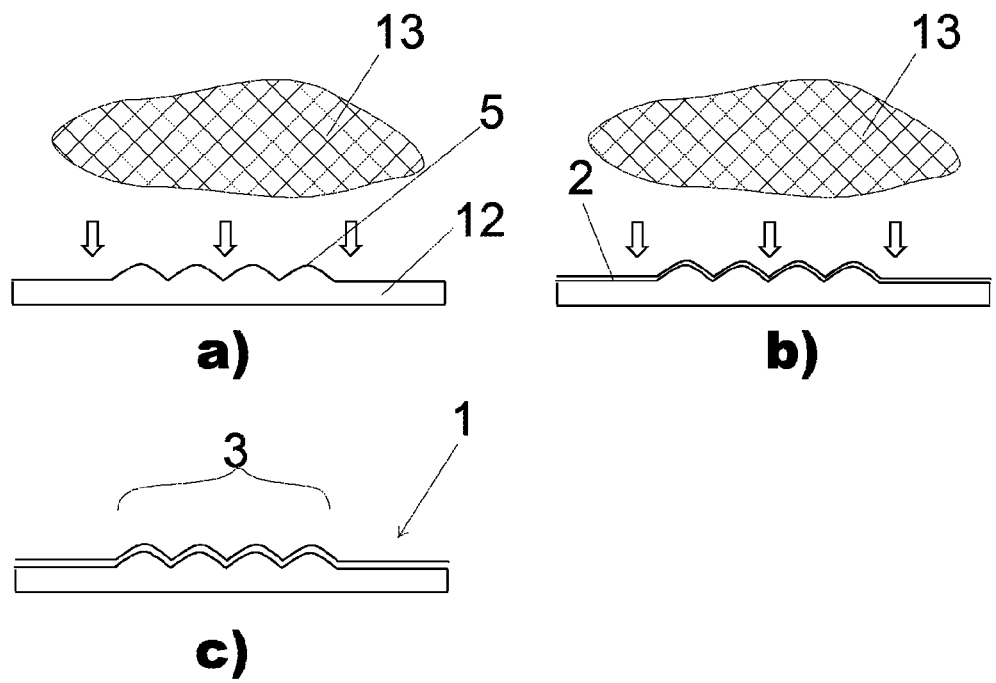

FIGS. 7a-7c illustrate schematically utilization of direct deposition of the conductive layer 2 on a substrate surface 12 having protrusions 5 thereon. The conductive layer material 13 e.g. in a gas, liquid, or aerosol form is directly deposited on the object surface 12 without the use of a separate substrate layer. The deposition can take place in a vacuum as in the conventional ITO process.

Figure 8:
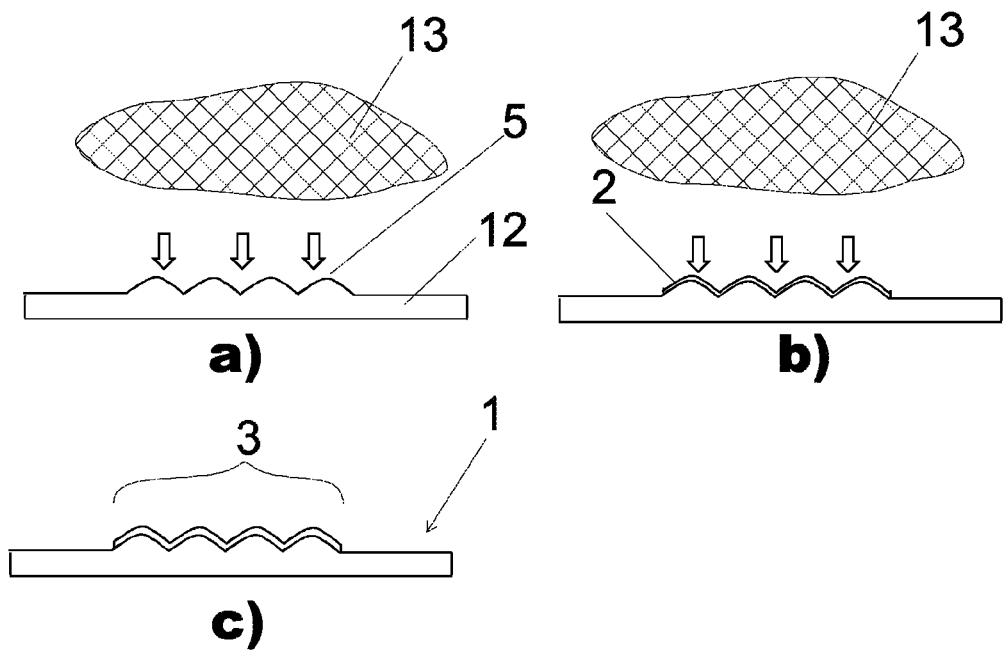
Figure 9:
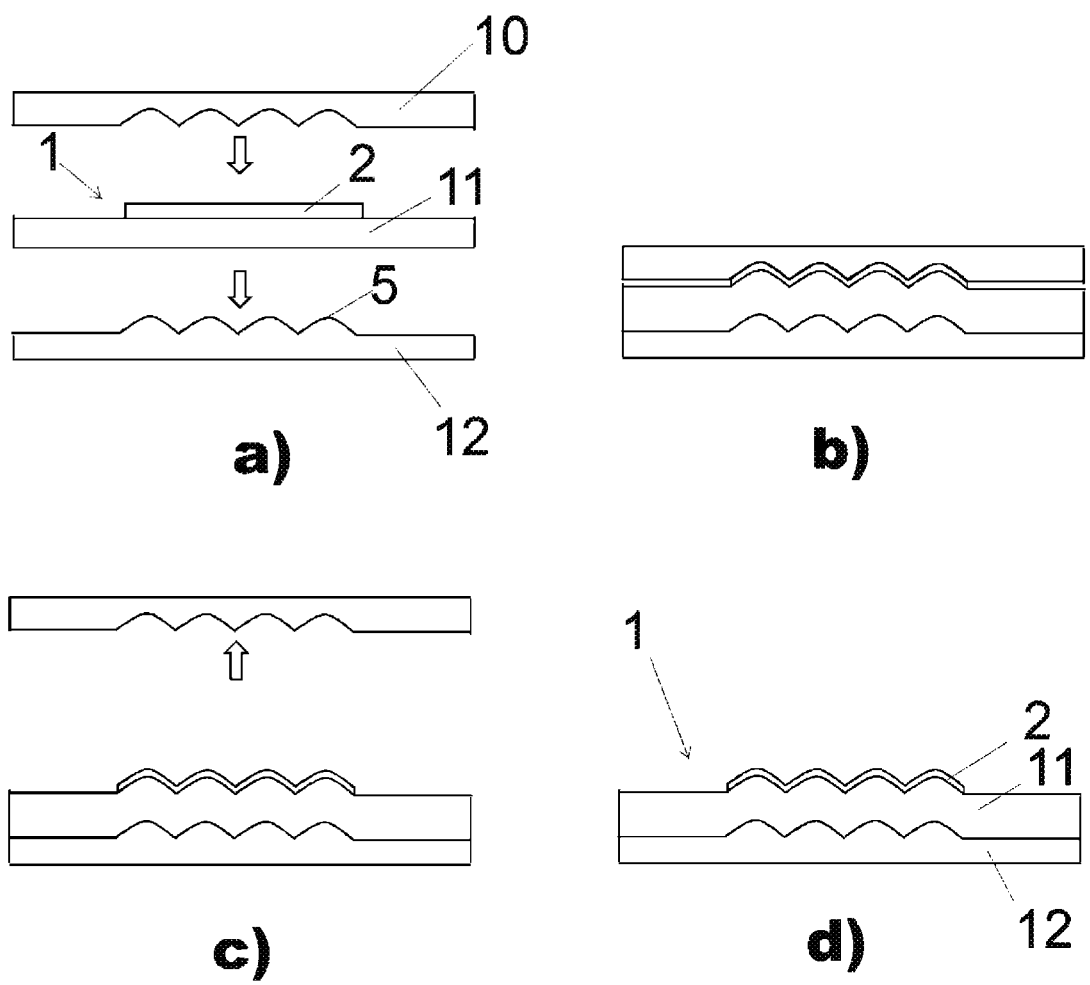

FIGS. 8a-8c illustrate schematically a variation of the process of FIGS. 7a-7c. In the process of FIGS. 8a and 8b, a segmented conductive layer 2 is deposited, wherein conductive layer material is deposited at the area of the touch sensing region 3 only.

FIGS. 9a-9d illustrate schematically utilization of stamping to form the tactilely distinguishable protrusions 5 on the user input surface 4 of the TSF 1. In the process of FIGS. 9a-9d, a touch sensitive film 1 having a segmented conductive layer 2 thereon is attached to an object surface 12 having a series of protrusions, and stamped using a stamping tool 10 against the object surface so that the protrusions are copied to the touch sensitive film. The stamping tool 10 having the inverse of the protrusions on the object is used both to produce a series of protrusions in a TSF and to attach the TSF to the object surface.

Other techniques are also available in the art to produce touch sensitive films having tactilely distinguishable surface features according to the present invention, thus the above examples do not in any way limit the scope of the invention.

Figure 10:
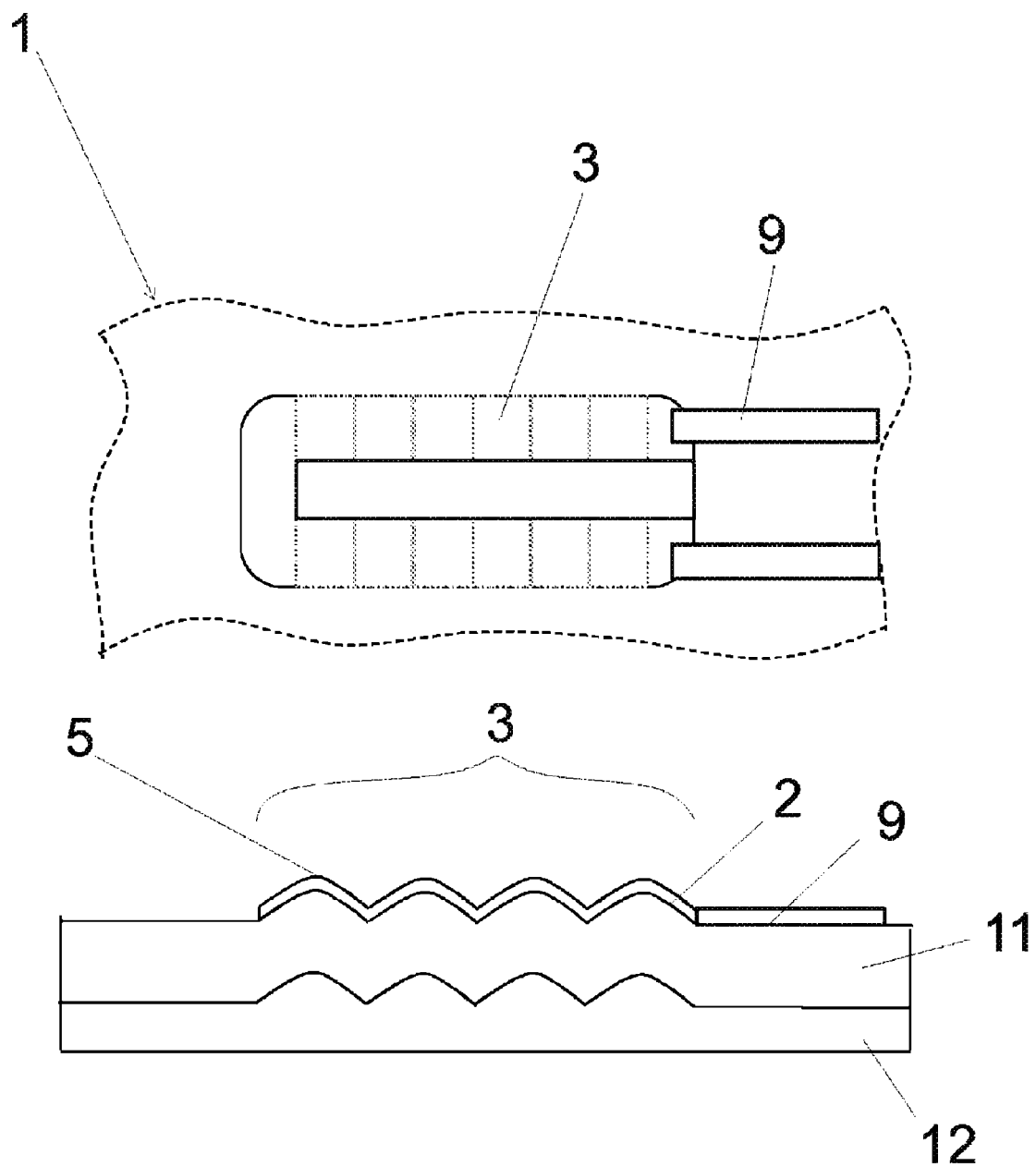
FIGS. 10 to 13 illustrate different configurations of the touch sensing region of a touch sensitive film according to the present invention.

FIG. 10 show a top view and a side view of a touch sensitive film 1 according to one preferred embodiment of the present invention. The TSF 1 has a touch sensing region 3 configured to act as a slider, i.e. a user interface element where the user controls his/her input via sliding the location of the touch along the touch sensing region. The touch sensing region 3 of FIG. 10 has a "U" shaped configuration. In this embodiment, input and output connector electrodes 9 are connected at the "top" end of the U. The sensor operates according the principles of the method and apparatus described in WO 2011/107666 by Canatu Oy. The U-shaped structure provides advantages such that the input and output electrodes are on the same side (at the top of the U) of the touch sensing region 3, thereby making integration of the touch sensitive film in an electronic device simpler. The U shaped sensor configuration is more compact than the alternative straight line sensor configuration shown in FIG. 11. By creating a U-shaped sensor, the finger or other pointer increases the electrical coupling and therefore the signal strength resulting from a touch. The distance between the "legs" of the U is not critical, but in the preferred embodiment a finger should be able to touch both legs of the U simultaneously, although, touching one side also works.

Figure 11:
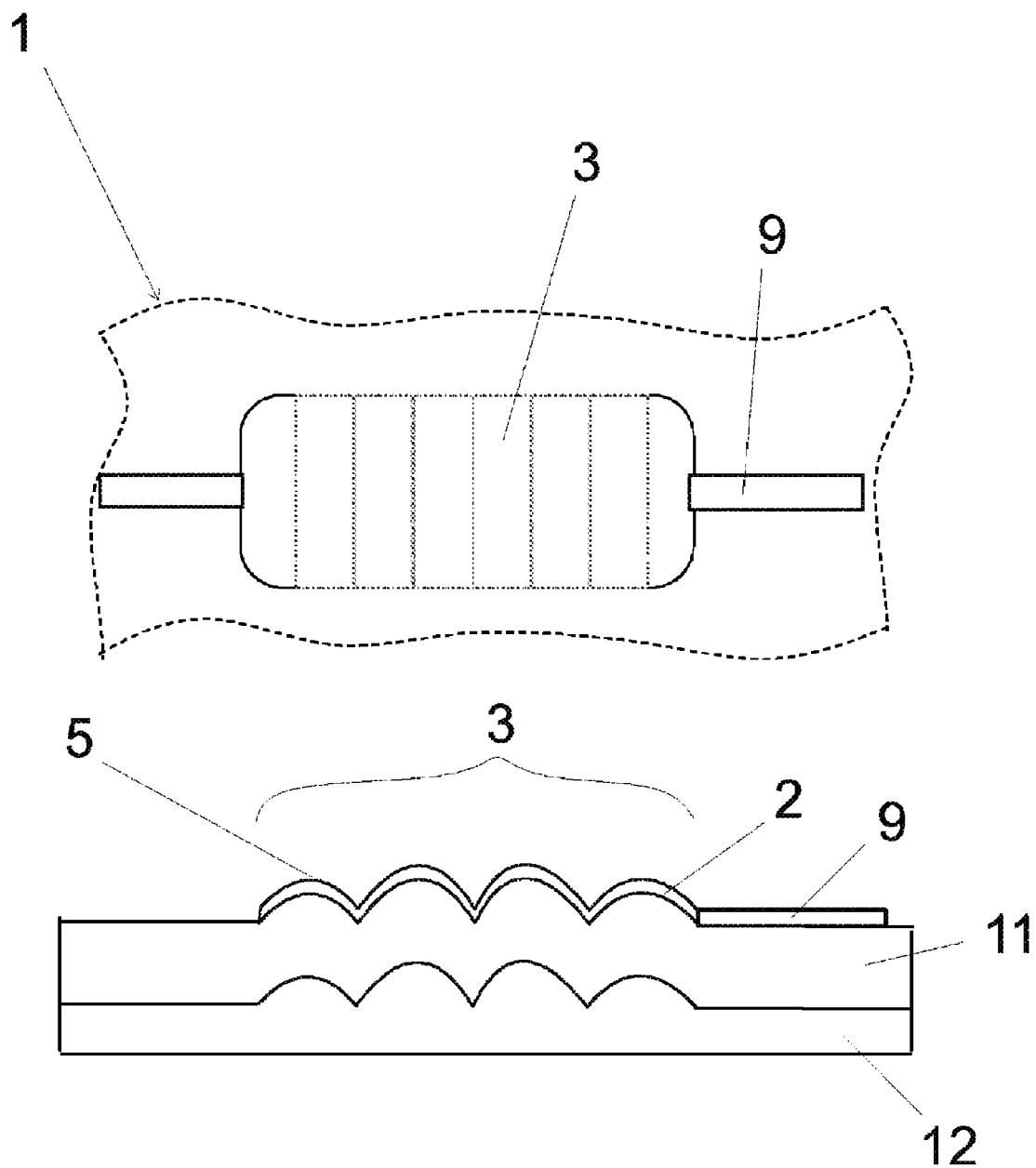

In the straight slider configuration of FIG. 11, the height of the protrusions 5 vary so that at the edges of the touch sensing region 3, the protrusions are lower than at the middle. This provides a graded tactile feel and thus enables the user to more accurately identify the location and movement of the touch along the touch sensing region.

Figure 12:
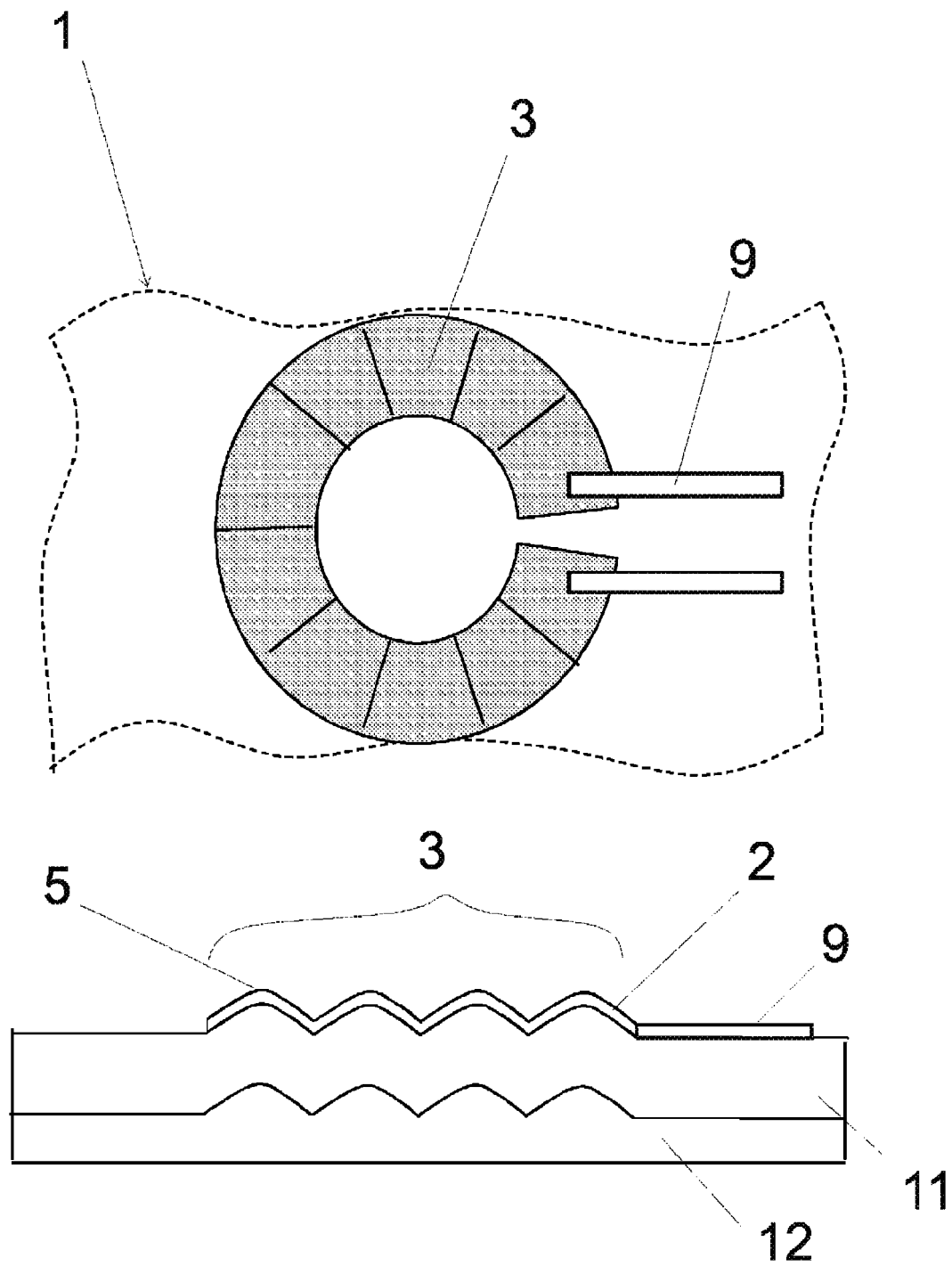

A variation of a curved touch sensing region is shown in FIG. 12 which illustrates a touch sensing region 3 configured to act as a dial, e.g. a user interference element where the user controls his/her input via sliding the location of the touch along the annular touch sensing region.

In the following, four examples A) to D) of different embodiments of the invention which can be produced and configured according to the embodiments above are discussed shortly. Examples A and C utilize only segmented TSRs on a larger TSF, which TSRs are aligned to the locations of the desired "buttons" and sliders. In examples B and D, the TSF has no pattern or segmentation, and software is used to identify the active regions and ignore the rest.

Example A

A slider device according to the invention is manufactured by, for instance, producing a TSF having a TSR with the required connections to the sensing circuitry, thermoforming said TSR over an object having, for instance, a TSR comprising a region of ridges or bumps in the area in which the slider function is to be carried out. The TSR is aligned to the region with ridges or bumps. In this case, the touch input is possible to be detected only in the slider region of the object.

Example B

A slider device according to the invention is manufactured by, for instance, producing a TSF having a TSR with the required connections to the sensing circuitry, thermoforming said TSF over an object having, for instance, a region of ridges or bumps in the area in which the slider function is to be carried out. The controlling software is then programmed to register touch only in the slider region of the object with ridges or bumps.

Example C

A slider and on/off button device according to the invention is manufactured by, for instance, producing a TSF having multiple TSRs with the required connections to the sensing circuitry, thermoforming said TSF over a shape having, for instance, a region of ridges in the area in which the slider function is to be carried out and a raised bump in the area in which the on/off button function is to be carried out. The TSRs are aligned to the regions with ridges and the bump. In this case, the touch input is possible to be detected only in the slider region of the object and the on/off button region of the object.

Example D

A slider and on/off button device according to the invention is manufactured by, for instance, producing a TSF having multiple TSRs with the required connections to the sensing circuitry, thermoforming said TSF over an object having, for instance, a a region of ridges in the area in which the slider function is to be carried out and a raised bump in the area in which the on/off button function is to be carried out. The controlling software is then programmed to register touch separately only in the slider region with ridges and the on/off button region with a bump.

Figure 13:
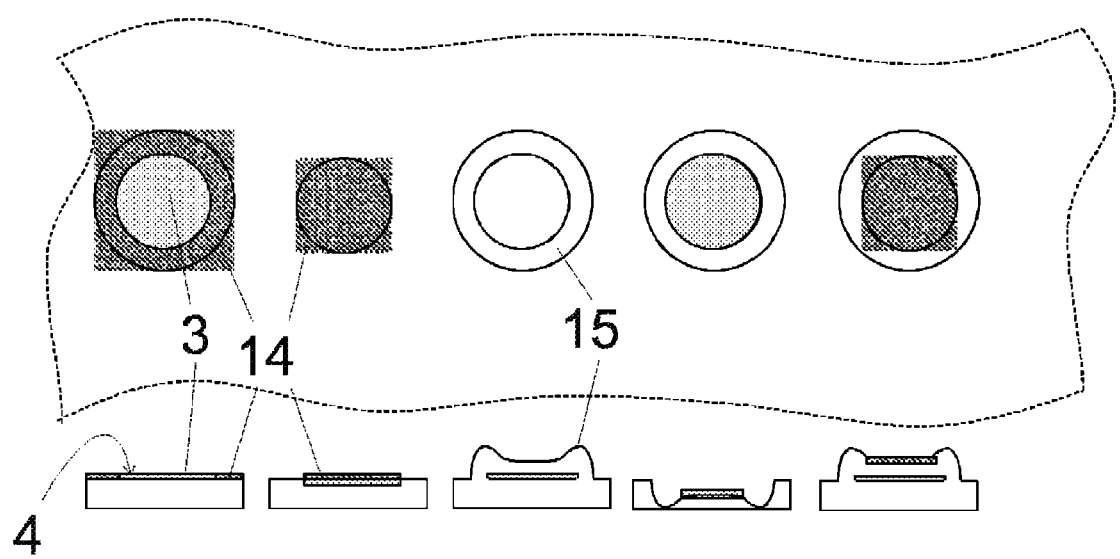

Shown in FIG. 13 are various tactilely distinguishable surface features (TDSFs) to be used e.g. to replace conventional on/off buttons in electronic devices. In the leftmost case, the smooth center area of the user input surface 4 above the touch sensing region 3 is encircled by a roughened surface area 14. In the second leftmost case, the UIS has a roughened surface over the entire area of the touch sensing region 3. In the middlemost case, an elevated annular ring 15 encircles a lower center area of the UIS above the touch sensing region 3. In the second rightmost case, the elevated form has replaced by a mirrored topology extending downwards from the general level of the UIS. The rightmost case shows a combination of an elevated TDSF and a roughened area in the middle area of the TDSF above the touch sensing region 3. Roughened surface areas can be produced e.g. by coating the TSF with a rough surface material. Alternatively, special treatments can be used to make an initially smooth surface roughened.

Figure 14:
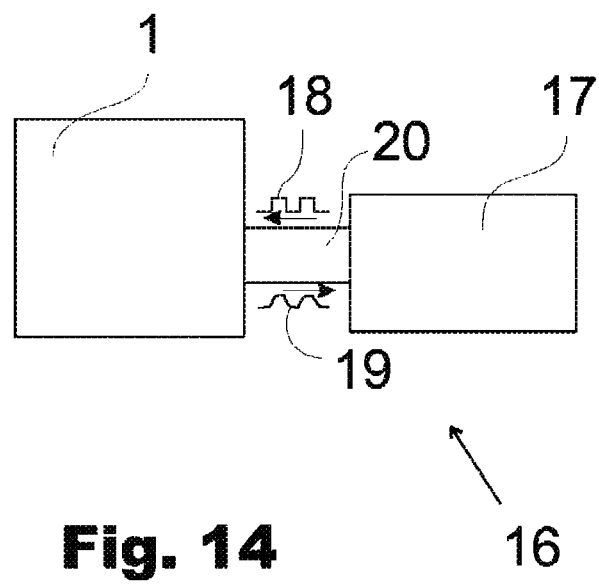
FIG. 14 presents, as a block diagram, a general structure of a touch sensing device according to the present invention.

The touch sensing device 16 of FIG. 14 can be e.g. a touch screen of a mobile electronic device according to that of FIG. 1d. The touch sensing device comprises a touch sensitive film 1, and a signal processing unit 17 for generating excitation signals 18 and controlling supply thereof to the touch sensitive film 1. The signal processing unit 17 is also responsible for receiving response signals 19 measured from the touch sensitive film 1, and for determining the presence and possibly also locations of touches on the basis of these signals. The signal processing unit 17 and the touch sensitive film 1 are connected to each other by means of signal wirings 20. The device according to FIG. 14 is configured to couple an excitation signal 18 comprising an alternating current or voltage to the conductive layer of the touch sensitive film via one or more of the contact electrodes thereon. These contact electrodes then serve as input points of the touch sensitive film. One or more contact electrodes on the conductive layer are used as output points for measuring the response signal (s). More detailed description of operation and preferred configurations of such touch sensing device is given e.g. in WO 2011/107666 by Canatu Oy.

As is clear for a person skilled in the art, the invention is not limited to the embodiments and examples described above but the embodiments of the present invention can freely vary within the scope of the claims. Particularly, the different features presented in the above embodiments and examples may be present in a touch sensitive film, touch sensing device, and an electronic device in any combination.

The invention claimed is:

1. A touch sensitive film (1) comprising:
a conductive layer (2) having a touch sensing region (3) and an immediately adjacent surrounding area, and
a user input surface (4) within the touch sensing region (3), the user input surface (4) comprising a touch sensitive film that defines a touch sensing electrode that is configured to serve as a touch-based user interface where, upon touch of a user's finger or stylus and without movement of the user input surface (4), changes electrical properties of an electrical measuring circuitry to which the user input surface (4) is connected,
wherein the touch sensing electrode within the touch sensing region (3) and the user input surface (4) comprises a tactilely distinguishable surface feature (5, 14, 15) that, when touched by a user, provides the user with a first tactile feel, wherein the conductive layer at the tactilely distinguishable surface feature, in cross section view, has an upper surface and a lower surface, the upper surface having a first contour line that includes plural adjacent upward protuberances and the lower surface having a second contour line that matches the first contour line of the upper surface and includes plural adjacent upward protuberances at locations matching the upward protuberances of the first contour line,
wherein the surrounding area immediately adjacent the touch sensing region (3) has a surface that is free of the upward protuberances and, when touched by a user, provides the user with a second tactile feel, the first and second tactile feels being different such that the user recognizes the tactilely distinguishable surface feature (5, 14, 15) as tactilely deviating from the immediately adjacent surrounding area of the user input surface, the tactilely distinguishable surface feature (5, 14, 15) thereby identifying the location of the touch sensing region (3) and the user input surface (4).

2. A touch sensitive film (1) as defined in claim 1, wherein the conductive layer (2) comprises one or more High Aspect Ratio Molecular Structure (HARMS) networks.

3. A touch sensitive film (1) as defined in claim 1, wherein a height of the protuberances extends above a surface of the surrounding area of the user input surface (4) immediately adjacent the touch sensing region (3).

4. A touch sensitive film (1) as defined in claim 1, wherein the user input surface (4) comprises plural of the touch sensing electrode, each of the touch sensing electrode comprising one of the tactilely distinguishable surface feature and a different respective set of electrodes (9).

5. A touch sensitive film (1) as defined in claim 1, wherein the tactilely distinguishable surface feature comprises first texture (14) different from a second texture of the user input surface (4), wherein, when touched by the user, the first texture is distinguishable from the second texture by the user.

6. A touch sensitive film (1) as defined in claim 1, wherein the tactilely distinguishable surface feature (5, 14) is configured to create a graded tactile feeling.

7. A touch sensitive film (1) as defined in claim 1, wherein the touch sensitive film comprises a curved section, and at least one of the touch sensitive region (3) and the tactilely distinguishable surface feature (5) lies on said curved section.

8. A touch sensitive film (1) as defined in claim 1, wherein the touch sensing region (3) is configured to act as a slider.

9. A touch sensitive film (1) as defined in claim 8, wherein the touch sensing region (3) configured to act as a slider is substantially U-shaped.

10. A touch sensitive film (1) as defined in claim 1, wherein the touch sensing region (3) has substantially annular shape and is configured to act as a dial.

11. A touch sensitive film (1) as defined in claim 1, wherein the touch sensitive film (1) comprises a plurality of touch sensing regions (3, 6).

12. A touch sensitive film (1) as defined in claim 11, wherein the touch sensitive film is configured to cover different surfaces of a three-dimensional device, the plurality of touch sensing regions (3) comprising a touch sensing region (6) configured to cover the area of a display (8) to form a touch screen.

13. A touch sensitive film (1) as defined in claim 1, wherein the tactilely distinguishable surface feature comprises a recessed annular ring that encircles the user input surface (4).

14. A touch sensitive film (1) as defined in claim 1, wherein the touch sensitive film (1) is formed as a deformable structure so as to allow conformal deformation of the touch sensitive film along a three dimensional surface.

15. A touch sensing device (16) comprising a touch sensitive film (1) according to claim 1, the touch sensing device further comprising:
means for supplying an electrical excitation signal to the touch sensitive film and receiving an electrical response signal from the touch sensitive film, and
means for processing the electrical response signal for detecting one or more touches on the basis of the effects of the touch on the response signal.

16. An electronic device (7) as defined in claim 1, the touch sensitive film being configured to serve as a user interface of the electronic device, and wherein the touch sensitive film (1) comprises a plurality of touch sensing regions (3, 6), the plurality of touch sensing regions comprising a touch sensing region (6) covering the area of a display (8) to form a touch screen.

17. An electronic device (7) as defined in claim 1, the touch sensitive film being configured to serve as a user interface of the electronic device, and the electronic device being a mobile electronic device.

18. A touch sensitive film (1) as defined in claim 1, wherein the tactilely distinguishable surface feature is an elevated annular ring (14) that encircles the user input surface (4), the touch sensitive film being one of the group consisting of
i) a capacitive touch sensitive film, the touch sensing electrode configured to detect the touch by capacitive sensing, and
ii) an inductive sensing film, the touch sensing electrode configured to detect the touch by inductive coupling.

19. A touch sensitive film (1) as defined in claim 1, further comprising:
a substrate (11), the conductive layer (2) being located on the substrate (11), the substrate (11) having an upper surface with a third contour line that matches the first contour line of the upper surface of the conductive layer at the tactilely distinguishable surface feature, and wherein the third contour line includes plural adjacent upward protuberances at locations matching the upward protuberances of the first contour line.

20. A touch sensitive film (1) comprising:
a conductive layer (2) having a touch sensing region (3) and an immediately adjacent surrounding area, and
a user input surface (4) within the touch sensing region (3), the user input surface (4) comprising a touch sensitive film that defines a touch sensing electrode that is configured to serve as a touch-based user interface where, upon touch of a user's finger or stylus and without movement of the user input surface (4), changes electrical properties of an electrical measuring circuitry to which the user input surface (4) is connected,
wherein the touch sensing electrode within the touch sensing region (3) and the user input surface (4) comprises a tactilely distinguishable surface feature (5, 14, 15) formed as one of the group consisting of surface deviating protrusions, surface deviating indentations, and surface deviating grooves, that, when touched by a user, provides the user with a first tactile feel, wherein the conductive layer at the tactilely distinguishable surface feature, in cross section view, has an upper surface and a lower surface, the upper surface having a surface deviating, first contour line and the lower surface having a surface deviating, second contour line that matches the surface deviating, first contour line,
wherein the surrounding area immediately adjacent the touch sensing region (3) has a surface that is free of the upward protuberances and, when touched by a user, provides the user with a second tactile feel, the first and second tactile feels being different such that the user recognizes the tactilely distinguishable surface feature (5, 14, 15) as tactilely deviating from the immediately adjacent surrounding area of the user input surface, the tactilely distinguishable surface feature (5, 14, 15) thereby identifying the location of the touch sensing region (3) and the user input surface (4).

* * * * *